United States Patent [19]
Hardin

[11] 3,936,717
[45] Feb. 3, 1976

[54] FORCE BALANCE TRANSMITTER AND PARTS THEREFOR OR THE LIKE

[75] Inventor: George T. Hardin, Knoxville, Tenn.

[73] Assignee: Robertshaw Controls Company, Richmond, Va.

[22] Filed: Aug. 21, 1974

[21] Appl. No.: 499,319

[52] U.S. Cl. .............................................. 318/676
[51] Int. Cl.² ........................................ G05B 1/06
[58] Field of Search ................................. 318/676

[56] References Cited
UNITED STATES PATENTS

| | | | |
|---|---|---|---|
| 3,123,754 | 3/1964 | Jones et al. | 318/676 |
| 3,211,003 | 10/1965 | Worden | 318/676 X |
| 3,359,471 | 12/1967 | Hart et al. | 318/676 X |
| 3,449,651 | 6/1969 | Cranch et al. | 318/676 X |
| 3,660,745 | 5/1972 | Bertrand | 318/676 |
| 3,832,618 | 8/1974 | Levesque et al. | 318/676 |
| 3,845,348 | 10/1974 | Riley | 318/676 |

*Primary Examiner*—B. Dobeck
*Attorney, Agent, or Firm*—Candor, Candor & Tassone

[57] ABSTRACT

A force balance transmitter having a frame and a process element carried thereby and being provided with a movable part adapted to move in response to certain changes in the process, the transmitter having feedback means that produces an output signal in relation to a feedback force thereof being created to oppose movement of a movable feedback part thereof. Three levers are pivotally mounted to the frame for transmitting motion of the movable parts of the process element to the movable feedback part of the feedback means whereby the overall height of the transmitter is relatively small in relation to the large ratio being produced by the levers of the transmitter.

16 Claims, 6 Drawing Figures

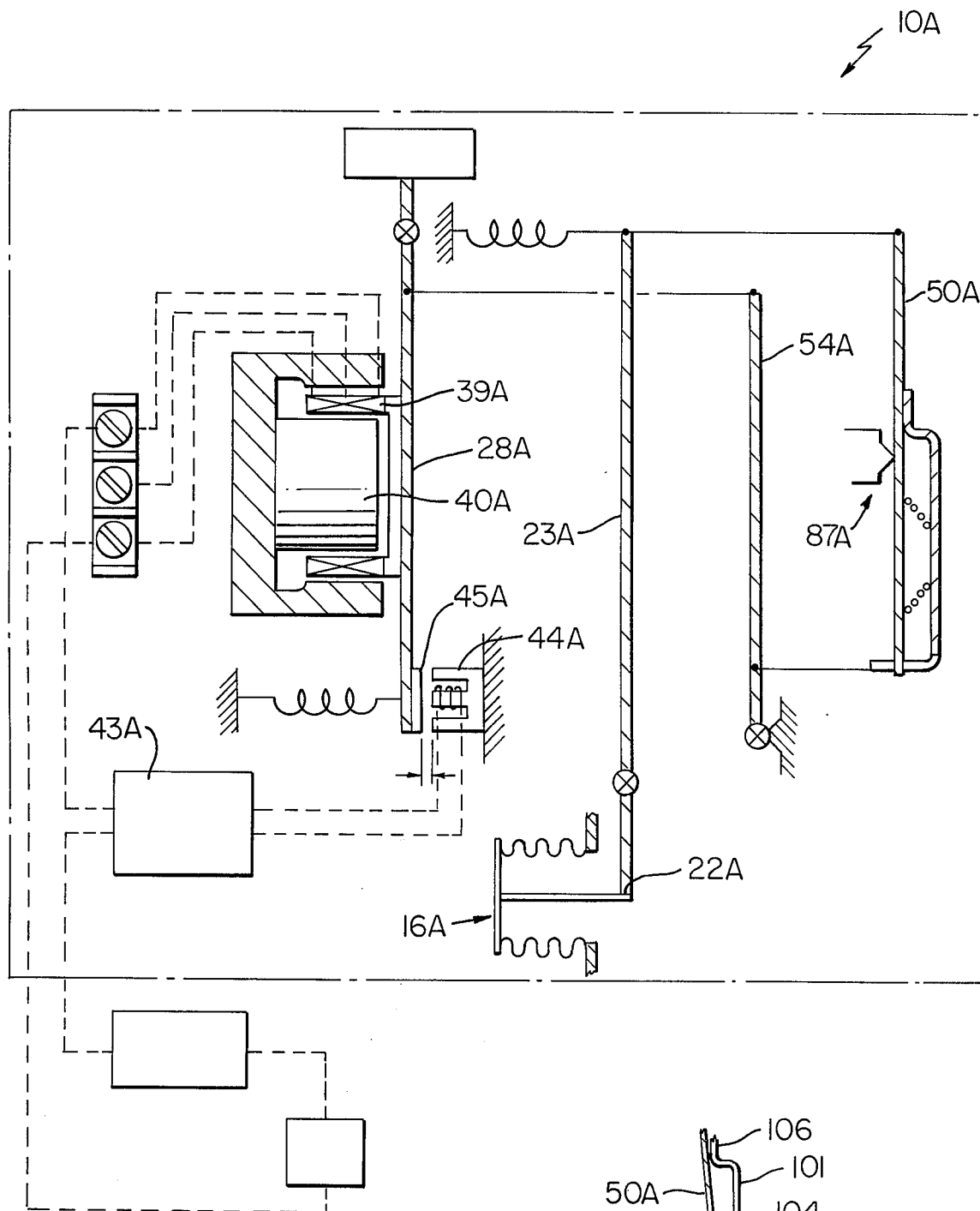
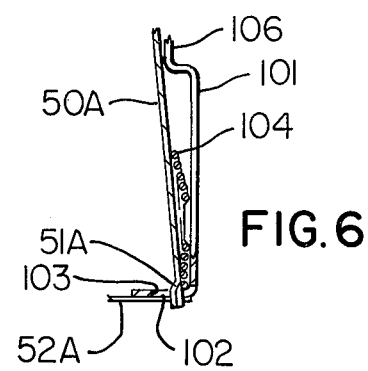
FIG. 5
FIG. 6

FORCE BALANCE TRANSMITTER AND PARTS THEREFOR OR THE LIKE

This invention relates to an improved force balance transmitter as well as to improved parts for such a transmitter or the like.

It is well known that force balance transmitters have been provided in the past with each having a process element carried by the frame of the transmitter and being provided with a movable part adapted to be moved in response to certain changes in the process. Such transmitter has feedback means carried by the frame and being adapted to produce an output signal in relation to a feedback force thereof being created to oppose movement of a movable feedback part thereof, the feedback part being attempted to be moved by the movable part of the process element through lever means of the transmitter interconnecting the same together. Such prior known force balance transmitters have the feedback means thereof pneumatically operated or electrically operated as desired.

One feature of this invention is to provide such a force balance transmitter wherein a unique lever arrangement is provided between the process element and the movable feedback part in such a manner that the same allows the transmitter to be much lower in profile than prior known transmitters that have a similar principle of operation thereof.

Another feature of this invention is to provide a force balance transmitter of the above type having an improved feedback arm that is particularly adapted to be utilized with an electrically operated feedback means, such feedback arm carrying a detector disc thereon that is located in a position for substantially maximum sensitivity and at the point of substantially maximum arm movement thereof.

Another feature of this invention is to provide a force balance transmitter of the above type wherein only one bias spring need be provided for the lever means thereof and such bias spring can be utilized for both coarse and fine zero adjustment of the transmitter.

Another feature of this invention is to provide a force balance transmitter of the above type having an adjustable overload mechanism which limits the amount of load that the lever means has to withstand in the event the movable part of the process element is driven beyond the normal positions thereof by excessive pressure or the like.

In particular, one embodiment of this invention provides a force balance transmitter having a frame means and a process element carried thereby and being provided with a movable part adapted to move in response to certain changes in the process being sensed thereby. The transmitter has feedback means carried by the frame means and is provided with output signal means for producing a signal in relation to a feedback force thereof created to oppose movement of a movable feedback part thereof. The transmitter has lever means operatively interconnecting the movable part of the process element to the movable feedback part of the feedback means. According to the teachings of this invention, the lever means comprises three levers pivotally mounted to the frame means for transmitting the motion of the movable part of the process element to the movable feedback part of the feedback means and being so constructed and arranged that the overall height of the transmitter is relatively short when considering the ratio of movement of the feedback part to the movement of the movable part of the process element. The movable feedback part comprises an arm pivotally mounted to the frame means at one end thereof and having a detector disc at the other end thereof so as to be detected by a detector of an electrically operated feedback means that controls the amount of current being directed to a feedback coil carried by the feedback arm intermediate its ends. A bias spring has one end connected to the primary lever of the lever means and has another end adjustably connected to the frame means. A gear train means is provided between a selector means and the adjustable end of the spring so as to provide for both coarse and fine zero adjustment of the bias spring. The primary lever has one end thereof interconnected to the movable part of the process element and the other end thereof connected to a second lever by an interconnection means that has overtravel means therein that is only taken up when excess pivot movement of the primary lever takes place by an excessive movement of the movable part of the process element.

Accordingly, it is an object of this invention to provide an improved force balance transmitter having one or more of the novel features set forth above or hereinafter shown or described.

Another object of this invention is to provide improved parts for such a force balance transmitter or the like.

Other objects, uses and advantages of this invention are apparent from a reading of this description which proceeds with reference to the accompanying drawing forming a part thereof and wherein:

FIG. 5 is a schematic view of the transmitter of FIG. 3 and illustrates the electrical circuit therefor.

FIG. 6 is a fragmentary view of part of the transmitter of FIG. 5 and illustrates an overtraveled condition thereof.

Figure 1:
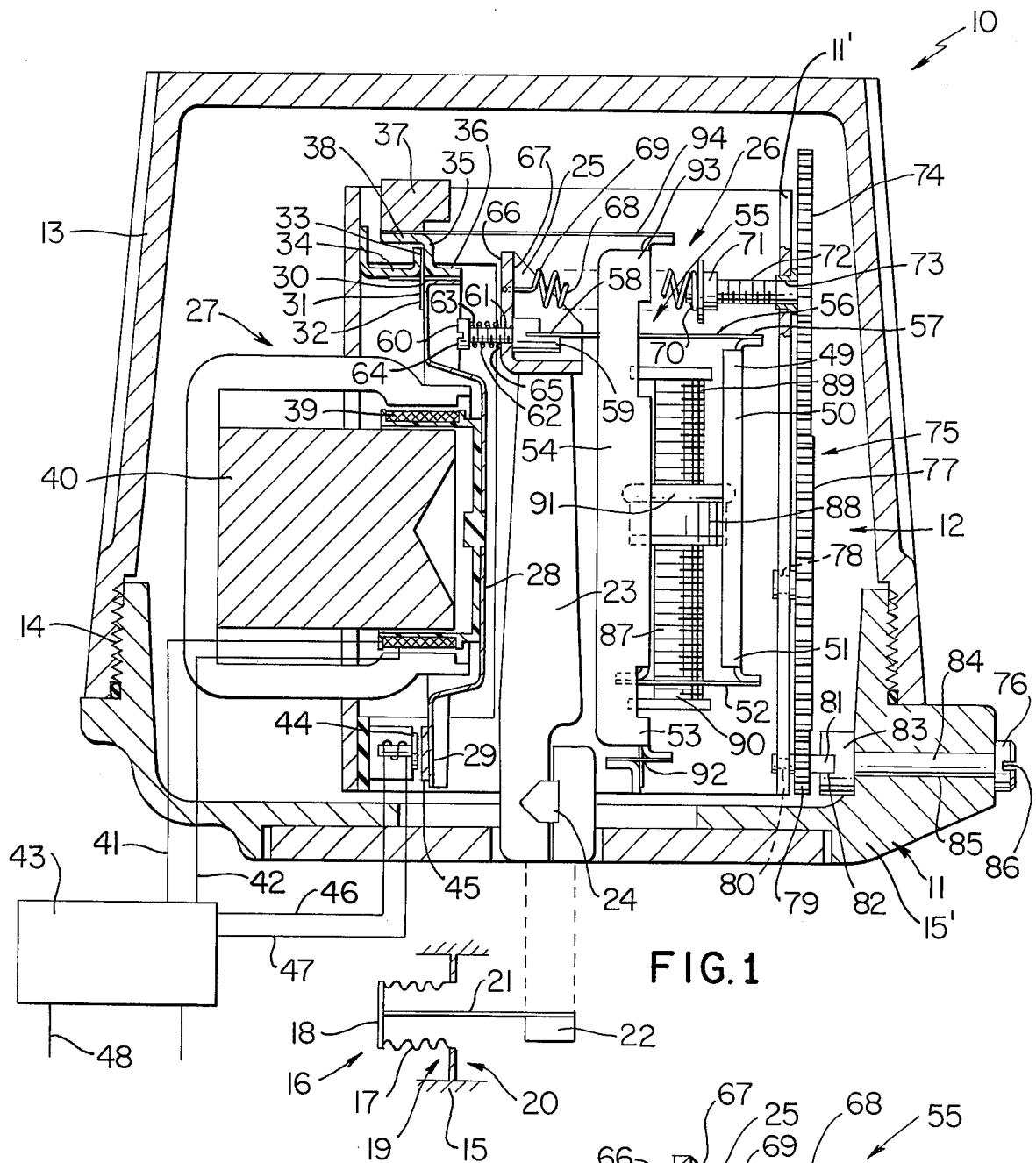
FIG. 1 is a cross-sectional view, partially in schematic form, illustrating one embodiment of the improved force balance transmitter of this invention.

While the various features of this invention are hereinafter described and illustrated as being particularly adapted to provide an electrically operated force balance pressure transmitter, it is to be understood that the various features of this invention can be utilized singly or in any combination thereof to provide improvements for other types of transmitters or the like.

Thus, this invention is not to be limited to only the embodiments illustrated in the drawings, because the drawings are merely utilized to illustrate one of the wide varieties of the uses of this invention.

Referring now to FIG. 1, the improved force balance transmitter of this invention is generally indicated by the reference numeral 10 and comprises a frame means generally indicated by the reference numeral 11 provided with a chamber means 12 therein that is closed by a casing or cup-shaped cover member 13 forming part of the frame means 11 while being detachably secured thereto by threaded fastening means 14 as indicated. The frame means 11 of the transmitter 10 comprises a primary body 15 carrying a base structure 15' having the cover 13 detachably secured thereto. The primary body carries a process element 16 in a manner well known in the art, the particular process element 16 illustrated in FIG. 1 comprising a bellows 17 having an end wall 18 adapted to be moved relative to the body 15 in relation to a pressure differential acting across the bellows 17. Of course, it is to be understood that the process element 16 could be a diaphragm, capsule, etc. as desired.

In any event, the movable part 18 of the process element 16 is interconnected by tying means 21 to a lower end 22 of a primary lever 23 pivotally mounted to the primary body 15 of the frame means 11 at a pivot point 24 thereof that is intermediate the lower end 22 and the upper end 25 of the lever 23, the primary lever 23 forming part of the lever means of the transmitter 10 that is generally indicated by the reference numeral 26 in FIG. 1.

The transmitter 10 is provided with an electrically operated feedback means that is generally indicated by the reference numeral 27 and comprises a feedback arm 28 having opposed ends 29 and 30, the end 30 being pivotally mounted to the frame means 11 by a cross flexure means 31 secured at its lower end 32 to the end 30 of the feedback arm 28 and at its upper end 33 to an L shaped bracket 34 of the frame means 11. An angle member 35 is secured at its lower end 36 to the end 30 of the feedback arm 28 and has a counter weight 37 secured to the upper end 38 thereof to provide optimum static and dynamic balance of the lever system 26 by minimizing the vibration effect and zero shift with position change of the lever means 26 as will be apparent hereinafter.

The feedback arm 28 carries a cylindrical electrical coil 39 that is telescopically disposed around a permanent magnet 40, the coil 39 being adapted to have electrical current supplied thereto by leads 41 and 42 under the control of an electronic circuit unit 43 that is conventional in the art and is adapted to increase the current flow through the feedback coil 39 as a detector assembly 44 senses that a detector disc 45 carried on the end 29 of the feedback arm 28 is being positioned closer thereto when the feedback arm 28 is being pivoted in a clockwise direction in FIG. 1 by the lever means 26 in a manner hereinafter described. Thus, the detector assembly 44, through its leads 46 and 47, causes the electrical circuit unit 43 to correspondingly increase the current flow through the coil 39 and, thus, out through a signal producing lead 48 to an indicator (not shown) that will indicate that an increased process pressure force is being sensed by the transmitter 10. This increased current flow through the feedback coil 39 causes the coil to be repulsed by the permanent magnet 40 to a greater extent so that the feedback arm 28 returns to and then remain in the condition illustrated in FIG. 1 until the feedback means 28 is again urged in a clockwise direction by an increase in pressure being sensed by the process element 16 or is moved in a counterclockwise direction by a decrease in system pressure as the case may be and in a manner hereinafter described.

The upper end 25 of the primary lever 23 is interconnected to an end 49 of a second lever 50 having its lower end 51 interconnected by a flexure member 52 to a lower end 53 of a third lever 54 of the lever means 26.

The upper end 25 of the primary lever 23 is interconnected to the upper end 49 of the second lever 50 by an interconnection means that is generally indicated by the reference numeral 55 and comprises a flexure member 56 having one end 57 secured to the upper end 49 of the lever 50 and its other end 58 secured to a block 59 that has a threaded adjusting member 60 threadedly disposed in a threaded bore (now shown) formed therein. The threaded adjusting member 60 passes out through an opening 61 in the upper end 25 of the primary lever 23 and has a compression spring 62 disposed about the same in such a manner that one end 63 of the compression spring 62 abuts against an enlarged head 64 of the adjusting member 60 and the other end 65 abuts against the side 66 of the end 25 of the primary lever 23 so as to tend to urge the block 59 of the flexure member 56 into abutting engagement with the other side 67 of the upper end 25 of the primary lever 23 in the manner illustrated in FIG. 1.

By adjusting the threaded relation of the adjusting member 60 relative to the block 59, the force of the compression spring 62 ill be adjusted with such force tending to maintain the block 59 into positive engagement with the side 67 of the upper end 25 of the primary lever 23 so that as the primary lever 23 pivots about the pivot point 24 thereof in either a clockwise or counterclockwise direction, the block 59 will be held in spring engagement with the side 67 of the upper end 25 of the primary lever 23 so as to move in unison therewith and thereby cause the flexure member 56 to cause the upper end 49 of the second lever 50 to move in unison therewith during all normal pivoting movement of the primary lever 23 upon normal movement of the movable part 18 of the process element 16.

Figure 2:
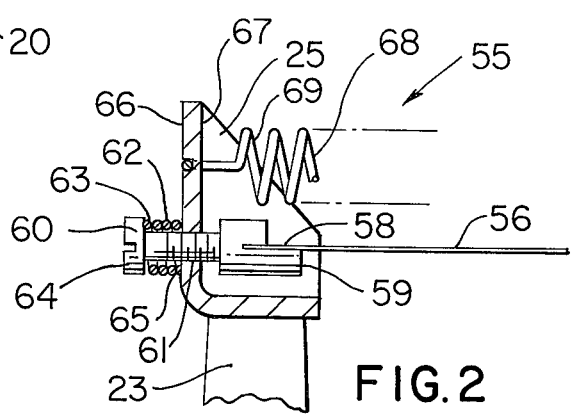
FIG. 2 is an enlarged fragmentary view of the upper end of the primary lever of the transmitter of FIG. 1 and illustrates the same in an excessive, overtraveled condition thereof.

However, should an excess pressure differential be created across the bellows 17 of the process element 16 so that the movable part 18 is driven to the right in FIG. 1 an excess amount to cause an excess pivoting movement of the primary lever 23 in a counterclockwise direction about the pivot point 24, the upper end 25 of the primary lever 23 will move to the left and compress the compression spring 62 in the manner illustrated in FIG. 2 so that such excess pivoting movement of the primary lever 23 is not imposed on the upper end 49 of the second lever 50 as the interconnection means 55 therebetween substantially "stretches" during such excess pivoting movement of the primary lever 23. Thus, it can be seen that the lever means 26 of the transmitter 10 is limited in the amount of load that the same has to withstand when the process element 16 is driven beyond the normal positions thereof by excessive system pressure as the compression spring 62 merely locks the flexure member 56 of the assembly 55 firmly to the primary lever 23 until a preset load is reached and at this point the interconnection means 55 extends in the manner illustrated in FIG. 2 to permit such excess movement without such excess movement being imposed upon the other parts of the transmitter 10.

A bias spring 68 has one end 69 interconnected to the upper end 25 of the primary lever 23 while the other end 70 thereof is fastened to a retainer 71 threaded on a threaded member 72 rotatably mounted to the frame means 11 by a bearing means 73. The threaded member 72 is interconnected to a gear 74 forming part of a gear train that is generally indicated by the reference numeral 75 and is disposed between the threaded member 72 and a rotatable adjusting member 76 disposed exteriorly of the frame means 11 as illustrated.

In particular, the gear train 75 comprises the gear 74 disposed in meshing relation with another gear 77 rotatably mounted to the frame means 11 by a shaft means 78, the gear 77 being in turn disposed in meshing relation with another gear 79 also rotatably mounted to the frame means 11 by a shaft means 80. However, the shaft means 80 has a rectangular extension 81 adapted to be received in a key slot means 82 of a part 83 of the adjusting member 76 that is disposed in the chamber 12 of the frame means 11 and is interconnected to the external part 76 by a shaft 84 passing through a bore 85 in the frame means 11 whereby the parts 76 and 83 will rotate in unison.

In this manner, a person can insert a screwdriver in a cross slot 86 formed in the external part 76 and rotate the same to thereby cause the part 83, through its driving relation with the rectangular part 81 of the gear 79, to rotate the gear 79 and, thus, cause the gear train 75 to rotate the threaded member 72 to thereby axially move the retainer 71 to the right or left in FIG. 1 and thereby increase or decrease the amount of force that the bias spring 68 is applying in an attempt to pivot the primary lever 23 in a clockwise direction in opposition to the force of the movable part 18 of the process element 16 tending to pivot the primary lever 23 in a counterclockwise direction because of the system pressure present in the chamber 19.

It has been found that the bias spring 68 serves for both coarse and fine zero adjust of the transmitter 10 as the system of gears 75 allows the adjustment to be made via the external zero screw means 76 and also permits fine adjustment by virtue of the gear reduction provided by the gear train 75. Accordingly, it has been found that by utilizing the gear train means 75 and the single bias spring 68, the fine zero spring normally interconnected to the feedback arm of prior known transmitters can be eliminated for the feedback arm 28 of the transmitter 10 of this invention as experiments have shown that transmitter performance suffers when a fine zero spring is required on the feedback arm.

A threaded shaft 87 is rotatably carried by the frame means 11 and has a pivot collar 88 threaded thereon and disposed between the opposed ends 89 and 90 thereof, the pivot collar 88 having an outwardly directed annular pivot flange 91 engageable against the second lever 50 to provide a pivot point therefor between the opposed ends 49 and 51 of the lever 50. Means (not shown) are provided for rotating the shaft 87 to thereby adjust the axial position of the pivot shoulder 91 of the threaded collar 88 thereon so as to adjust the pivot point for the second lever 50 to the desired position thereon.

The lower end 53 of the third lever 54 is pivotly mounted by a cross flexure means 92 to the frame means 11 at a point below the point of interconnection of the flexure member 52 to the lever 54, the flexure member 52 leading from the end 51 of the second lever 50.

The third lever 54 has an upper end 93 interconnected by a flexure member 94 to the part 35 of the upper end 30 of the feedback arm 28 as illustrated.

It can be seen in FIG. 1 that the frame means 11 includes a main bracket 11' that can be mounted directly to the primary body 15 rather than directly to the bore 15' as will be apparent in connection with the transmitter 10A of FIG. 3 later to be described to prevent zero shifts that could occur if external loading were applied to either the cover 13 or base 15'. In any event, it can be seen that the main bracket 11' carries the lever means 26 of the transmitter 10.

Thus, it can be seen that the lever means 26 for the transmitter 10 effectively interconnects the movable part 18 of the process element 16 to the feedback arm 28 so as to cause the transmitter 10 to operate in a manner now to be described.

Assuming that the transmitter 10 is in the condition illustrated in FIG. 1 and the same is interconnected into a system where the pressure fluid of the system is received in the chamber 19 of the primary body 15 whereby the force of the same acting on the bellows construction 17 tends to move the movable part 18 to the right in FIG. 1 to tend to cause the primary lever 23 to pivot in a counterclockwise direction and such force of the process element 16 acting on the primary lever 23 is fully counterbalanced by the force of the bias spring 68 tending to pivot the lever 23 in a clockwise direction, the electronic circuit means 43 is delivering a signal through the lead 48 indicating that the pressure of the process is at the set value for the transmitter 10.

However, should the pressure in the chamber 19 thereafter increase so that the resulting increase in pressure differential acting across the bellows construction 17 tends to cause the movable part 18 to move further to the right, such movement of the movable part 18 of the process element 16 causes counterclockwise pivoting of the primary lever 23 about the pivot 24 and, through the interconnection means 55, causes counterclockwise pivoting of the second lever 50 about its pivot point 91. Such counterclockwise pivoting of the second lever 50 causes clockwise pivoting of the third lever 54 about its pivot point 91 whereby the interconnection 94 causes the feedback arm 28 to pivot in a clockwise direction on its pivot means 31.

This clockwise pivoting of the feedback arm 28 causes the lower end 29 of the feedback arm 28 to move the detector disc 45 closer to the detector assembly 44 which thus causes the electronic circuit unit 43 to increase the flow of current through the feedback coil 39. This increased flow of current through the feedback coil 39 causes the same to be repulsed away from the permanent magnet 40 until the feedback arm 28 returns to the position illustrated in FIG. 1, such return movement of the feedback arm 28 to the position illustrated in FIG. 1 causing the levers 54, 50 and 23 to reverse pivot from the manner previously described also back to the position illustrated in FIG. 1. The increased flow of current through the coil 39 now maintains the system in the condition illustrated in FIG. 1. Of course, the increased flow of current through the feedback coil 59 is also being directed by the lead 48 to an indicating device that indicates the increase in pressure of the system which is now present in the chamber 19.

Conversely, a decrease in system pressure in the chamber 19 and thereby a resulting decrease in the pressure differential acting across the bellows construction 17 causes the movable part 18 of the process element 16 to move to the left in FIG. 1, through the force of the bias spring 68, whereby the primary lever 23 pivots in a clockwise direction about its pivot point 24 and thereby through the interconnection means 55 causes the lever 50 to pivot in a clockwise direction about its pivot point 91. Such clockwise pivoting of the lever 50 causes the lever 54 to pivot in a counterclockwise direction about its pivot point 92 and thereby causes a counterclockwise pivoting of the feedback arm 28 on its pivot 31. Such counterclockwise pivoting of the feedback arm 28 moves the detector disc 45 further away from the detector assembly 44 which causes the circuit 43 to reduce the flow of current through the coil 39 so that the permanent magnet 40 tends to draw the feedback arm 28 back to the position illustrated in FIG. 1. Such clockwise movement of the feedback arm 28 causes the lever means 26 to reverse pivot from the manner previously described so as to move back to the position illustrated in FIG. 1. Of course, this reduced current flow now being sent through the feedback coil 39 by the circuit unit 43 is being sensed by the indicator interconnected to the lead 48 which will indicate that the process pressure in the chamber 19 has decreased accordingly.

Therefore, it can be seen that the transmitter 10 operates in the manner previously described to provide its force balance function.

However, because of the unique lever means 26 of this invention, it has been found that the combined ratios of the ratio lever 23 and feedback arm 28 can be approximately 36 to 1 and that a similar design with only the feedback arm would require almost double the height that is provided by the transmitter 10 of this invention.

Also, by locating the detector disc 45 on the lower end 29 of the feedback arm 28, it can be seen that the detector disc 45 is located for maximum sensitivity at the point of maximum feedback arm movement.

Also, only one bias spring 68 need be provided for the transmitter 10 as the gear train means 75 permits the spring 68 to be adjusted for both coarse and fine zero adjust of the transmitter 10.

Also, the interconnection means 55, through the compression spring 62 thereof, limits the amount of load that the lever mechanism 26 will be subjected to by the process element 16 as the spring 60 will takeup such excess movement in the manner illustrated in FIG. 2 and in the manner previously described.

Another force balance transmitter of this invention is generally indicated by the reference numeral 10 in FIGS. 3–6 and parts thereof similar to the force balance transmitter 10 previously described or indicated by like reference numerals followed by the reference letter A.

Figure 3:
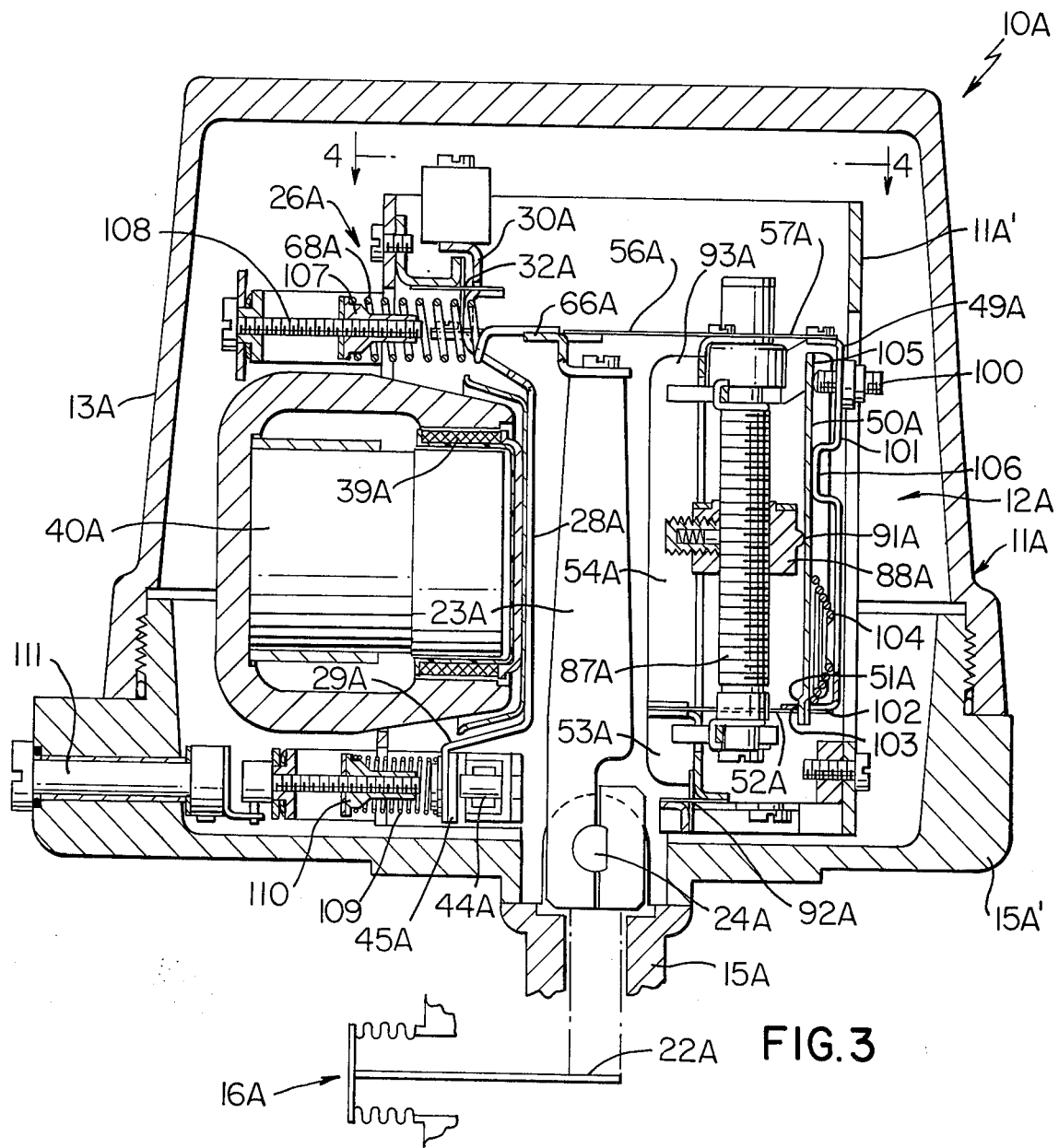
FIG. 3 is a view similar to FIG. 1 and illustrates another embodiment of a force balance transmitter of this invention.

As illustrated in FIG. 3, the transmitter 10A includes the primary body 15A, base structure 15A' and cover 13A whereby the primary body 15A, base 15A' and cover 13A forms the frame means 11A of the transmitter 10A that carries the main bracket means 11A' in a chamber 12A thereof, the bracket means 11A' being supported on the primary body 15A.

In this manner, the main bracket 11A' is mounted directly to the primary body 15A and does not contact the base 15A' or cover 13A at any point. However, the base 15A' is also mounted to the primary body 15A. The primary arm 23A is a member of the primary body 15A and all other elements in the mechanism 10A are attached to the main bracket 11A'. Thus, this arrangement prevents zero shifts that would occur when external loads are applied to either the cover 13A or base 15A' if the bracket 11A' were mounted to the base 15A'.

The process element 16A of the transmitter 10A is adapted to develop force in proportion to some process variable in the same manner as the process element 16 previously described. This force of the process element 16A is applied to the point 22A of the primary arm 23A which will rotate about the pivot 24A. This pivoting movement of the primary arm 23A is applied by the upper end 66A of the arm 23A to flexure arms 56A attached at the ends 57A thereof to the upper end 49A of the span arm or lever 50A to cause the same to rock about the adjustable pivot point 91A of the adjustable member 88A carried on the threaded adjusting means 87A.

The lower end 51A of the span arm or lever 50A is interconnected by flexure means 52A to lever arm 54A that is pivotally mounted by cross flexure means 92A at the lower end 53A thereof and is interconnected at the upper end 93A thereof to flexure arms 94A interconnected at the left-hand ends thereof in FIG. 3 to the upper end of the feedback arm 28A that is pivotally mounted at the upper end thereof by a cross pivot flexure means 32A.

In order to minimize zero shifts that can occur when the nut 88A is adjusted to vary the span pivot point 91A for the lever 50A, a means is provided in the transmitter 10A for adjusting the span arm or lever 50A parallel to the axis of motion of the span adjustment nut 88A. This adjustment is affected with a paralleling screw 100 threadedly carried by a bracket member 101 that is attached to the flexure 56A and carries the arm 50A to pivot in unison therewith because the lower end 51A of the arm 50A is disposed in a lower slot 102 of the bracket member 101 and is held against the left-hand end 103 thereof by a compression spring 104 disposed between the bracket member 101 and the lower end 51A of the lever 50A while the upper end 105 of the lever 50A bears against the adjustment screw 100 as well as an intermediate part 106 of the bracket 101.

In this manner, over range protection is provided by the over range bracket 101 which is held in position by the over range spring 104. However, when the tension load at point 103 exceeds a preset value, the over range arm 101 separates from the span arm 50A at the lower end 51A thereof end allows the span arm 50A and primary arm 23A to have unrestrained movement in the manner illustrated in FIG. 6. This load value is above the range of loads encountered in normal instrument function and this separation occurs only when the measured process variable exceeds the instrument upper range limit. Accordingly, this mechanism allows for over range to occur without either damage to instrument parts or measurable zero shift.

Figure 4:
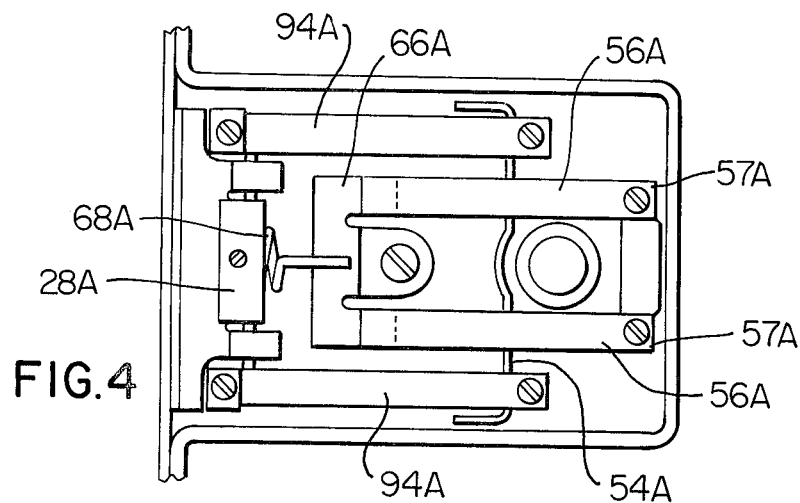
FIG. 4 is a fragmentary cross-sectional view taken on the line 4-4 of FIG. 3.

A range spring means 26A is interconnected to the primary arm 23A by having one end of the tension spring 68A thereof interconnected to the upper end 66A of the primary arm 23A as best illustrated in FIG. 4 and the other end being carried by an adjusting nut means 107 mounted in the chamber 12A to be adjusted by a threaded adjusting member 108 rather than externally as provided by the adjustment member 84 of FIG. 1.

The lower end 29A of the feedback arm 28A carries the detector disc 45A which is adapted to have its position sensed by the detector assembly 44A, the end 29A of the feedback assembly 28A having an adjustable fine zero spring 109 bearing against the same and being carried by a threaded adjusting means 110 that can be adjusted by an externally mounted adjustment member 111 to provide for fine zero adjustment through its direct action on the feedback arm 28A. This zero spring 109 is also adapted to be used to set up proper preload conditions on the levers and flexures of the transmitter 10A which is desirable for good linearity.

The feedback arm 28A carries the coil 39A which is adapted to be moved relative to the core 40A to function in a manner now to be described.

As best illustrated in FIG. 5 wherein the various parts of the transmitter 10A are illustrated schematically, it can be seen that when pressure is applied to the process bellows arrangement 16A, a load is transmitted to the primary arm 23A at point 22A and through the series of interconnected levers 50A and 54A will cause the feedback lever or arm 28A to drive the detector disc 45A toward the detector assembly 44A. However, an electronic circuit means 43A responds with an increase in current to the coil 39A of the feedback arm 28A to increase its attraction toward the permanent magnet 40A to create a counterbalancing force to tend to maintain the feedback arm 28A in the true vertical position illustrated in FIG. 5 and for the reasons previously described. Thus, every process pressure is counterbalanced by the unique value of the signal current being directed by the circuit 43A to the coil 39A of the feedback arm 28A.

A loss of process force causes the feedback arm 28A to tend to move away from the detector 44A and thereby causes a decrease in signal current as previously described for the transmitter 10.

The attractive force of the coil magnet combination is directly proportional to the number of turns of wire on the coil 39A when all other factors are held constant. This principle is employed as a means of dividing the instrument span into low and high ranges. For high spans, all windings of the coil 39A are wired into the circuit but for low spans only approximately one third of the windings of the coil 39A need be utilized whereby fine span adjustment is accomplished with the span adjustment assembly 87A.

Thus, it can be seen that the transmitter 10A opperates in substantially the same manner as the transmitter 10 previously described except that in the transmitter 10A the gears and gear train 75 have been eliminated, the range spring 26A has been relocated, the fine zero spring 109 has been added to the module arm 28A, the detector system has been relocated and the action of the feedback arm 28A has been revised, the main flexures have been relocated and the overrun assembly has been relocated.

Therefore, it can be seen that this invention not only provides an improved force balance transmitter or the like but also this invention provides improved parts for such a transmitter or the like.

While the form of the invention now preferred has been described and illustrated as required by the Patent Statute, it is to be understood that other forms can be utilized and still come within the scope of the appended claims.

What is claimed is:

1. In a force balance transmitter having a frame means and a process element carried by said frame means and provided with a movable part adapted to move in response to changes in said process, said transmitter having feedback means carried by said frame means and having output signal means for producing a signal in relation to a feedback force thereof created to oppose movement of a movable feedback part thereof, the improvement comprising three levers pivotally mounted to said frame means transmitting motion of said movable part of said process element to said movable feedback part of said feedback means, said three levers comprising first, second and third levers respectively having opposed ends, said first lever having one end thereof interconnected to said movable part of said process element to be pivoted thereby, said second lever having one end thereof interconnected to the other end of said first lever, said third lever having one end thereof interconnected to the other end of said second lever and having the other end thereof interconnected to said movable feedback part of said feedback means, said three levers being arranged in substantially a parallel side-by-side relation with said third lever being disposed intermediate said first and second levers.

2. A force balance transmitter as set forth in claim 1 wherein said feedback means is electrically operated.

3. A force balance transmitter as set forth in claim 2 wherein said movable feedback part comprises an arm pivotally mounted to said frame means and carrying a feedback coil.

4. A force balance transmitter as set forth in claim 3 wherein said feedback arm has opposed ends, one end of said arm being pivotally mounted to said frame means, said feedback means having means for detecting the position of the other end of said arm.

5. A force balance transmitter as set forth in claim 4 wherein said coil is carried by said arm intermediate said ends thereof.

6. A force balance transmitter as set forth in claim 1 wherein said first lever is pivotally mounted between said ends thereof.

7. A force balance transmitter as set forth in claim 1 wherein said second lever is pivotally mounted between said ends thereof.

8. A force balance transmitter as set forth in claim 7 and including an adjustable pivot point means for said second lever.

9. A force balance transmitter as set forth in claim 1 wherein said third lever is pivotally mounted at said one end thereof.

10. A force balance transmitter as set forth in claim 1 and including a bias spring having one end connected to said first lever and having another end adjustably connected to said frame means, and means for adjusting said other end of said spring relative to said frame means to provide for both coarse and fine zero adjustment of said transmitter.

11. A force balance transmitter as set forth in claim 10 wherein said means for adjusting said spring includes a rotatable selector member, and gear train means disposed between said other end of said spring and said selector member to transmit adjustment motion of said selector member to said other end of said spring.

12. A force balance transmitter as set forth in claim 11 wherein said frame means includes a casing covering said spring and gear train therefor, said selector member having a portion thereof disposed outside said casing to permit adjustment thereof without removing said casing.

13. A force balance transmitter as set forth in claim 1 wherein interconnecting means interconnect said other end of said first lever to said one end of said second lever, said interconnecting means having overtravel means to take up excess pivot movement of said first lever.

14. A force balance transmitter as set forth in claim 13 wherein said interconnecting means comprises a flexure member having one end thereof interconnected to said second lever and the other end thereof spring pressed to said other end of said first lever by a spring to normally move in unison therewith except when excess movement is provided which is taken up by said spring.

15. A force balance transmitter as set forth in claim 14 wherein said spring has means for adjusting the force of said spring.

16. A force balance transmitter as set forth in claim 14 wherein said spring is a compression spring and has one end interconnected to said other end of said flexure member.

* * * * *